United States Patent [19]
Machlan

[11] 3,806,621
[45] Apr. 23, 1974

[54] ELECTRIC FURNACE
[75] Inventor: George R. Machlan, Newark, Ohio
[73] Assignee: Owens-Corning Fiberglas Corporation, Toledo, Ohio
[22] Filed: Oct. 13, 1972
[21] Appl. No.: 295,611

Related U.S. Application Data
[63] Continuation-in-part of Ser. No. 144,143, May 17, 1971, abandoned.

[52] U.S. Cl. .................................................. 13/6
[51] Int. Cl. ........................................... C03b 5/02
[58] Field of Search ........................................ 13/6

[56] References Cited
UNITED STATES PATENTS
3,328,153  6/1967  Augsburger........................ 13/6 X
3,395,237  7/1968  Orton...................................... 13/6

Primary Examiner—Roy N. Envall, Jr.
Attorney, Agent, or Firm—Staelin & Overman, Oliver E. Todd, Jr.

[57] ABSTRACT

A furnace suitable for electrically heating a molten glass having less than 1 percent alkali metal content and similar materials having a predetermined high electrical resistance at molten temperatures. The furnace includes a melting chamber for containing a body of the molten glass which is completely covered with a blanket of unmelted glass batch. The melting chamber has at least one sidewall formed from a low solubility chromic oxide refractory and a bottom formed from a refractory having a high electrical resistance at the temperature of the molten glass. At least one first electrode and a plurality of second electrodes are positioned in the chamber for heating the glass when power is applied therebetween. The second electrodes are interconnected and positioned between the first electrode and the sidewall to limit the maximum potential difference or electrical stress in the sidewall, preferably to less than 3 percent of the voltage applied between the electrodes.

39 Claims, 5 Drawing Figures

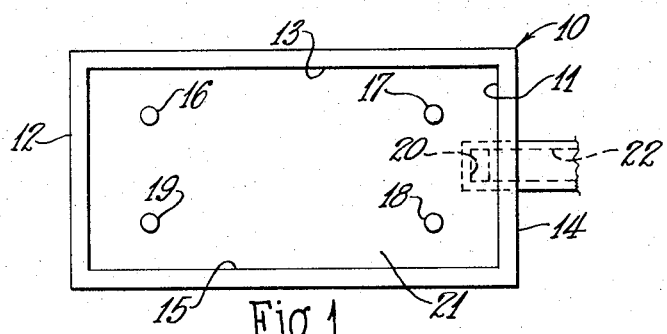
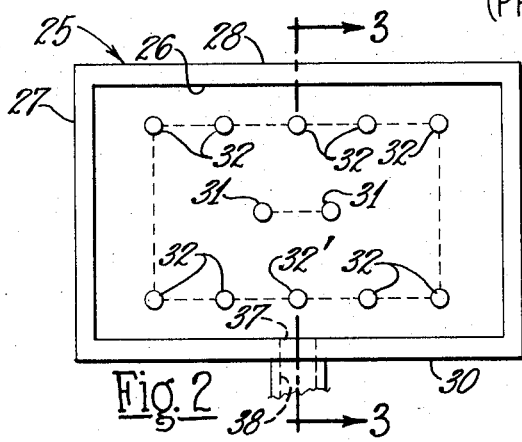
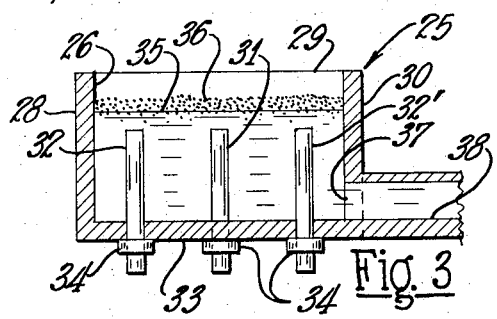
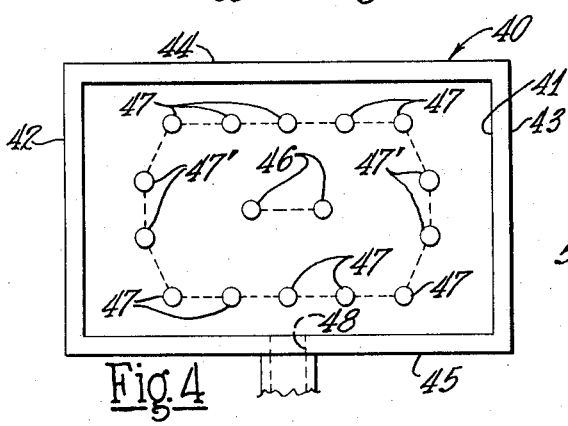
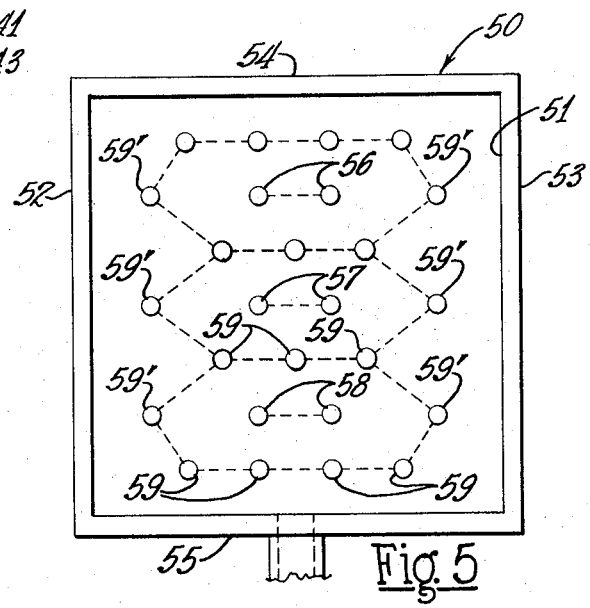

ELECTRIC FURNACE

CROSS-REFERENCE TO RELATED APPLICATION

This is a continuation-in-part of my copending application Ser. No. 144,143, filed May 17, 1971 now abandoned.

BACKGROUND OF THE INVENTION

This invention relates to glass manufacturing and more particularly to an improved furnace suitable for electrically heating a molten glass having a relatively high electrical resistivity at molten temperatures.

In glass manufacturing, glass is generally made by melting a batch of raw glass materials in a refractory lined furnace. The furnace may be heated by a hydrocarbon burner, by electricity, or by a combination of a burner and electricity. Hydrocarbon burning glass furnaces generally comprise a refractory lined chamber for holding a body of molten glass and a plurality of fuel burners positioned to direct heat to the upper surface of the molten glass. Raw glass batch is delivered to one end of the melting chamber and molten glass is removed at the opposite end of the chamber. A stirring device may be positioned within the melting chamber to promote uniformity in the molten glass. Electrically heated glass furnaces similarly include a refractory lined chamber for holding a body of molten glass. Two or more electrodes are submerged in the molten glass for heating the glass through the Joule effect when electric power is applied between the electrodes. The raw glass batch is supplied to, and floats on, the upper surface of the body of molten glass, while the molten glass is removed at a submerged throat located in a sidewall or the bottom of the melting chamber. Heat generated by high current densities at the electrodes causes violent convection currents in the molten glass, which continuously stir the glass as it is heated. The design and type of heating sources used in glass melting furnaces are determined by various factors, such as the composition and properties of the glass and economic factors.

Various types of refractory materials are used for holding molten glass in glass melting furnaces. Typical glass contact refractory materials for low alkali borosilicate glasses include chromic oxide, zircon and dense fused silica. The useful life of refractories for glass furnaces is primarily determined by the rate which the refractory material dissolves in the molten glass. Of the available refractory materials for use in the low alkali borosilicate glass furnaces, chromic oxide has the longest life, lasting at least 10 times longer than zircon, the next best refractory material, and up to one hundred or more times longer than other refractory materials. The useful life of many refractories, such as dense fused silica, can be extended by water cooling the refractory to a temperature wherein the refractory dissolves very slowly in molten glass. However, cooling the refractory drastically reduces the efficiency of the furnace and water cooled dense fused silica still has a shorter useful life than chromic oxide refractory materials. Problems may arise in using a chromic oxide refractory for holding some molten glass due to the fact that dissolved refractory material imparts a greenish tint to the glass. Furthermore, chromic oxide refractory has a low electrical resistivity at temperatures encountered in glass melting furnaces. The low resistivity can cause problems in electric furnaces.

Alkali metals, usually sodium or potassium, are often added to glass as a flux to facilitate melting the glass and to lower the viscosity of the molten glass. However, alkali metals cause hot glass to have a low electrical resistivity. Glass used for manufacturing electrical insulators and much of the glass used for manufacturing glass fibers for textiles typically have less than 1 percent alkali metal content and, in some instances, are free of alkali metals. As a result, in a molten state these glasses have a relatively high electrical resistivity compared to normal glass. Fluorine is often added to this glass to serve as a flux to aid in placing some of the batch materials in solution, to reduce bubbles in the molten glass, and to reduce the viscosity of the molten glass. However, the fluorine is a fugitive material. Of the 1 percent to 2 percent fluorine which may be mixed with the raw batch, a large portion of the fluorine is driven from the molten glass and perhaps only 0.4 percent to 0.5 percent will remain in the glass. Boron may also be emitted from the molten glass. This is undesirable since the emitted fluorine and boron may cause air pollution problems. In fuel burning furnaces, the emitted fluorine may also combine with hydrogen in exhaust gases to form hydrogen fluoride.

One method for reducing or eliminating the emission of fluorine and boron from molten glass is to use an electric furnace and to maintain a continuous blanket of unmelted batch floating on the surface of the molten glass in the furnace. The fluorine and boron will then chemically react with batch materials or condense in the floating blanket of batch. This in turn reduces the amount of fluorine which must be added to the batch.

In the past, attempts to electrically melt glass having a high resistivity in a furnace formed from a chromic oxide refractory material have not been too successful. The low resistivity of chromic oxide refractory material and the higher resistivity of the molten glass cause a major portion of the electric current delivered to the furnace to flow through and heat the refractory rather than the glass. This causes hot spots and uneven heating of the glass. One solution to this problem is to use a refractory having a high resistivity at the temperature of the molten glass. However, zircon, the next best refractory material, dissolves in the glass much more rapidly than chromic oxide and, after dissolving in the glass at furnace temperatures, it often recrystallizes from the glass as the temperature is reduced to working temperatures.

SUMMARY OF THE INVENTION

According to the present invention, an improved furnace is provided which is suitable for electrically melting glass or other materials having an electrical resistivity higher than the electrical resistivity of a refractory material which defines a melting chamber within the furnace. A low solubility refractory material, preferably a chromic oxide refractory for a glass furnace, is shaped to define a melting chamber for holding a body of molten glass. A plurality of electrodes are positioned within the chamber for heating the glass by means of the Joule effect. When the furnace is used with a single phase power source, one or more first electrodes are connected to the hot side of the power source and a plurality of interconnected second electrodes are connected to the grounded side of the power source. The first electrodes are positioned within the melting chamber adjacent the center of the chamber, while the second electrodes are spaced between the first electrodes and the conducting sidewalls of the chamber. The second electrodes are located to limit the potential difference or electrical stresses in the sidewalls, preferably to less than 3 percent of the voltage applied between the electrodes. Where multiple phase power sources are used, there is a group of first electrodes for each phase and the second electrodes are positioned between first electrode groups, as well as between the first electrodes and the refractory sidewalls of the furnace chamber.

Compounded batches of raw glass materials may be distributed over the surface of the body of molten glass in the melting chamber and the molten glass is preferably removed at a submerged throat. The glass batch is distributed to maintain a continuous blanket over the surface of the molten glass to reduce or eliminate the emission of fluorine and boron at the surface. It is also desirable to have one or more second electrodes positioned adjacent the submerged throat at which the molten glass is removed for causing upwardly directed convection currents in the molten glass at the throat to prevent unmelted batch material from entering the throat.

Accordingly, it is a preferred object of my invention to provide an improved furnace for electrically melting glass.

Another object of the invention is to provide an electric furnace capable of melting glass having a predetermined electrical resistivity wherein the refractory walls of the furnace have a predetermined lower electrical resistivity.

Still another object of the invention is to provide an improved electrical furnace for melting glass containing less than 1% alkali metals.

Other objects and advantages of the invention will become apparent from the following detailed description, with reference being made to the accompanying drawings.

BRIEF DESCRIPTION OF THE DRAWINGS

FIG. 1 is a top plan view of a prior art furnace for electrically melting glass;

FIG. 2 is a top plan view of an electric furnace for melting glass according to a first embodiment of the invention;

FIG. 3 is a cross-sectional view taken along line 3—3 of FIG. 2;

FIG. 4 is a top plan view of a furnace for electrically melting glass according to a second embodiment of the invention; and FIG. 5 is a top plan view of a furnace for electrically melting glass according to a third embodiment of the invention.

DESCRIPTION OF THE PREFERRED EMBODIMENTS

Referring now to FIG. 1, a typical prior art glass melting furnace 10 is shown in plan. The furnace 10 comprises a melting chamber 11 defined by four sidewalls 12–15 and four electrodes 16–19 for supplying electrical energy to a body of molten glass held within the chamber 11. Raw batches of glass material are added to the chamber 11 from adjacent one of the sidewalls 12, while molten glass is removed from the chamber 11 at a submerged throat 20 located in a floor 21 of the furnace 10 adjacent the opposed sidewall 14. A passage 22 connects the throat 20 to a forehearth (not shown) and from there the molten glass is withdrawn for shaping into products. Either two single-phase power sources or a single four-phase power source are connected to the four electrodes 16–19 for heating the molten glass within the chamber 11 through the Joule effect. When two single-phase power sources are used, one phase is connected between the electrodes 16 and 18 and the other phase is connected between the electrodes 17 and 19. This results in currents flowing in the molten glass diagonally across the chamber 11. When a sour-phase power source is used, currents flow between each of the four electrodes. The extremely high current densities at each of the electrodes 16–19 cause hot spots in the molten body of glass adjacent the electrodes. The hot spots in turn cause violent convection currents in the glass which continuously stir the molten glass.

The design of the furnace 10 for melting glass is satisfactory as long as the sidewalls 12–15 have an electrical resistivity considerably higher than the electrical resistivity of the molten body of glass. The current flowing within the walls defining the chamber 11 increases as the resistivity of the walls decreases. Current flowing within the walls will heat the sidewalls by the Joule effect, in the same manner in which currents heat the body of molten glass. As the resistivity of the walls decreases, the temperature of the walls increases and the heat generated within the body of molten glass decreases. It is therefore readily apparent that to prevent overheating of the walls of prior art electric furnaces, the molten glass must have a lower electrical resistivity than the walls of the furnace.

The three best refractory materials commonly used for low alkali borosilicate glass manufacturing furnaces are dense fused silica, zircon and chromic oxide. Of these materials, the chromic oxide is by far the best refractory for glass furnaces due to its low solubility in molten glass; zircon is the next best refractory. At the temperatures of molten glass, chromic oxide refractory will dissolve in molten glass at approximately one-tenth the rate of zircon. The composition of a typical chromic oxide refractory includes 95% $Cr_2O_3$, 4% $TiO_2$, 0.2% $Fe_2O_3$ and small quantities of $SiO_2$, $CaO$ and $B_2O_3$. A typical composition for a zircon refractory is 65% $ZrO_2$, 34.4% $SiO_2$, 0.25% $Al_2O_3$, 0.2% $TiO_2$ and traces of $Fe_2O_3$, $CaO$, $MgO$ and alkali metals. The composition of a typical high resistivity glass such as is used in manufacturing electrical insulators and glass fibers for textiles is 55% $SiO_2$, 15% $Al_2O_3$, 22% $CaO$ and 7% $B_2O_3$. There may be a trace of alkali metals and other impurities in this glass, although there is always less than 1 percent since alkali metals have a great effect on the resistivity of glass. The approximate resistivity of chromic oxide refractory, zircon refractory and the high resistivity glass are shown below in Table 1.

TABLE I

Resistivity in Ohm-Centimeters

| Temperature °C. | Chromic Oxide Refractory | Zircon Refractory | High Resistivity Glass |
|---|---|---|---|
| 800 | 10.2 | $6.5 \times 10^4$ | >1000 |
| 1000 | 2.5 | $1.6 \times 10^4$ | >1000 |
| 1200 | <1 | $6 \times 10^3$ | 608 |
| 1300 | <1 | $4.5 \times 10^3$ | 204 |
| 1500 | <<1 | $3 \times 10^3$ | 12 |

In view of Table I, it is readily apparent that high resistivity glass cannot be melted in the furnace 10 of FIG. 1 when the sidewalls 12–15 of the melting chamber 11 are formed from chromic oxide refractory. Due to the low resistivity of chromic oxide refractory, currents will follow the shortest paths through the glass to the sidewalls 12–15 and will then flow through the sidewalls. This results in excessive heating of the sidewalls and inadequate heating of the glass.

Turning now to FIGS. 2 and 3, a furnace 25 is shown according to a first embodiment of the invention. The furnace 25 includes a melting chamber 26 defined by four sidewalls 27–30. The sidewalls 27 and 29 are parallel and the sidewalls 28 and 30 are parallel to give the melting chamber 26 a rectangular plan section. At least one, and preferably a pair of first or hot electrodes 31 are mounted to lie in a first vertical plane centered between and parallel to the sidewalls 28 and 30. A plurality of interconnected grounded second electrodes 32 are mounted in a second vertical plane extending parallel to and spaced between the sidewall 28 and the first electrodes 31 and in a third vertical plane extending parallel to and spaced between the sidewall 30 and the first electrodes 31. Electrical interconnections between the hot first electrodes 31 and between the grounded second electrodes 32 are shown by dashed lines in FIG. 2 and in subsequent figures. The second electrodes 32 extend in the second and third planes considerably closer to the sidewalls 27 and 29 than the first electrodes 31. Through this arrangement, the walls 28 and 30 are maintained near the ground potential and electrical stresses in the walls 27 and 29 are minimized. If the electrodes 31 and 32 are spaced sufficiently from the walls 27 and 29, these sidewalls may be constructed from a chromic oxide refractory even though a high resistivity glass is melted in the furnace 25.

The electrodes 31 and 32 are mounted to project through a furnace bottom 33. Since the furnace bottom 33 is subjected to high electrical stresses, it must be constructed from a refractory material having an extremely high electrical resistivity, such as dense fused silica. In this case, water jackets 34 are provided around the electrodes 31 and 32 to cool the furnace bottom 33 and thereby to reduce cutting or dissolving of the bottom 33 by the molten glass. Since a large number of interconnected electrodes 31 and interconnected electrodes 32 are used for heating the body of glass in the furnace 25, a lower voltage may be used for heating the glass. This results in lower current densities at the electrodes 31 and 32 which in turn eliminates the violent convection currents occurring adjacent each electrode in the embodiment of FIG. 1. By eliminating the violent convection currents, erosion of the bottom 33 is greatly reduced.

One advantage of using the electric furnace 25 for heating high resistivity glass is that fluorine added to the glass as a flux and to control viscosity and boron are not emitted from an upper surface 35 of the molten glass within the furnace 25. Cool batch materials 36 are distributed over the surface 35 to form a continuous blanket. The blanket of cool batch materials 36 confines the added fluorine to the molten glass in the furnace 25 and also prevents the release of boron from the molten glass. This is a distinct advantage over fuel burning surfaces in which the upper surface 35 of the molten glass is heated by a flame, allowing the release of fluorine and boron into the atmosphere.

Molten glass is removed from the furnace through a throat 37 extending through one of the sidewalls 30 and located below the surface 35 of the molten glass. At least one of the ground electrodes 32' is shown located adjacent the submerged throat 37. Heat generated around the ground electrode 32' causes upwardly directed convection currents in the molten glass which prevent the raw batch materials 36 floating on the surface 35 of the molten glass from entering the throat 37. The throat 37 is then connected by means of a passageway 38 to a conventional forehearth and from there the molten glass is delivered to machinery for manufacturing various types of products.

The embodiment shown in FIGS. 2 and 3 has some disadvantages in that the walls 27 and 29 still may be stressed by as much as 10–15 percent of the voltage applied between the hot electrodes 31 and the ground electrodes 32. This stress may be reduced by spacing the electrodes 31 and 32 further from the sidewalls 27 and 29 which results in cooler glass adjacent these walls. Although the stresses on the sidewalls 27 and 29 may sometimes be higher, it is usually desirable to arrange the second electrodes 32 to limit the maximum potential difference in any sidewall to not more than 15 percent of the voltage between the electrodes 31 and 32 and, preferably, the potential difference is not more than 3 percent of such voltage.

Referring now to FIG. 4, a second embodiment is shown of a glass melting furnace 40. The furnace 40 has a rectangular shaped melting chamber 41 defined by a pair of parallel sidewalls 42 and 43 and a second pair of parallel sidewalls 44 and 45. As with the furnace in FIG. 2, the furnace 40 is designed for use with a single phase power source and incorporates at least two first electrodes 46 surrounded by a plurality of interconnected second electrodes 47. The first electrodes 46 are positioned adjacent the center of the melting chamber 41 and lie in a first vertical plane parallel to the sidewalls 44 and 45. A first row of the second electrodes 47 are positioned in a second vertical plane spaced between and parallel to the plane of the first electrodes 46 and the sidewall 44 and a second row of the second electrodes 47 lie in a third vertical plane spaced between and parallel to the plane of the first electrodes 46 and the sidewall 45. The first electrodes 46 are spaced considerably further from the sidewalls 42 and 43 than end ones of rows of second electrodes 47 in the second and third planes. In addition, two of the second electrodes 47' are positioned in a fourth vertical plane parallel to the sidewall 42 and spaced inwardly between end electrodes in the rows of second electrodes 47 in the second and third planes and spaced between the first electrodes 46 and the sidewall 42. Two second electrodes 47' are similarly positioned in a fifth vertical plane parallel to the sidewall 43 and located between the first electrodes 46 and the sidewall 43. These second electrodes 47' isolate the sidewalls 42 and 43 from the electrical stresses which may occur in the sidewalls 27 and 29 of the embodiment of FIG. 2. With this arrangement, the maximum electrical stress or potential difference appearing on each of the sidewalls 42–45 may be kept to below 2 percent to 3 percent of the voltage applied between the first electrodes 46 and the second electrodes 47. As in the embodiment of FIG. 2, raw batches of glass materials are distributed over the surface of a body of molten glass held within the melting chamber 41 of the furnace 40. Molten glass is removed from a submerged throat 48 extending through the sidewall 45. With this arrangement, the sidewalls 42–45 may be formed from chromic oxide refractory material, even though a high resistivity glass is melted in the furnace 40.

Turning now to FIG. 5, a furnace 50 is shown which is suitable for electrically melting a high resistivity glass from a multiple phase power source, in this case a three-phase power source. The furnace 50 includes a rectangular melting chamber 51 defined by parallel sidewalls 52 and 53 and parallel sidewalls 54 and 55. The sidewalls 52–55 may again be formed from a low solubility chromic oxide refractory material. Three groups of first electrodes 56–58 are mounted in vertical planes parallel to and spaced between the sidewalls 54 and 55. A three-phase power source is then connected between the groups of first electrodes 56, 57 and 58 for heating the glass. Interconnected second electrodes 59, which may be grounded, are mounted in rows in four vertical planes extending parallel to the sidewalls 54 and 55 and spaced, respectively, between the first electrode group 56 and the sidewall 54, between the first electrode group 56 and the first electrode group 57, between the first electrode group 57 and the first electrode group 58, and between the first electrode group 58 and the sidewall 55. The three groups of electrodes 56-58 are spaced further from the sidewalls 52 and 53 than the rows of interconnected second electrodes 59 in the four above-mentioned planes. One or more additional second electrodes 59' are positioned between each of the groups of first electrodes 56–58 and the sidewalls 52 and 53 to prevent electrical stresses from occurring in these sidewalls. As in the embodiment of FIG. 4, a proper spacing of the interconnected second electrodes 59 and 59' will reduce electrical stresses in each of the sidewalls 52–55 to less than 3 percent of the voltage applied between the groups of electrodes 56, 57 and 58. It will be readily apparent that the design of the furnace 50 may be adapted to a two-phase power source or to other multi-phase power sources having more than three phases. The use of multi-phase power sources has the advantage of permitting zone control over temperatures within the furnace.

It will be appreciated that various modifications and changes may be made in the electrode locations and spacing in the electric furnace of this invention. Furthermore, the furnace may be used for electrically melting glasses having low resistivities as well as high resistivities and for electrically melting other electrically conductive materials without departing from the spirit and the scope of the following claims.

What I claim is:

1. A furnace for electrically heating an electrically conductive material comprising, in combination, a chamber for containing a body of such material, at least one first electrode, a plurality of electrically interconnected second electrodes for said first electrodes, means mounting said first and second electrodes in a spaced relationship in said chamber with said second electrodes at least partially surrounding said first electrode, and means for applying electrical power to such material through said first and second electrodes for heating such material by the Joule effect.

2. A furnace for electrically heating an electrically conductive material, as set forth in claim 1, and wherein said container includes an electrically conductive wall in contact with the material, and wherein said means mounting said second electrodes mounts at least a portion of said second electrodes between said first electrode and said wall to limit the maximum potential difference in said wall to not more than 15 percent of the voltage between said first and second electrodes.

3. A furnace for electrically heating electrically conductive molten materials, comprising, in combination, a chamber for containing a body of such molten material, said chamber having a bottom and walls of refractory material, at least one first electrode in said chamber, a plurality of electrically interconnected second electrodes in said chamber, means mounting said second electrodes to at least partially surround said first electrode, and a power source for establishment of a potential difference between said first electrode and said second electrodes for heating such material by the Joule effect.

4. A furnace, as set forth in claim 3, and wherein at least one second electrode is spaced from each said first electrode a distance less than the distance between said first electrode and the closest wall of said furnace.

5. A furnace, as set forth in claim 3, and wherein said second electrodes are spaced in positions about said first electrodes such that the distance between any first electrode and the closest wall of the chamber is greater than the distance between said first electrode and a second electrode.

6. A furnace for electrically heating electrically conductive materials comprising, in combination, a chamber for containing a molten body of such materials, said chamber having an electrically non-conductive bottom and having at least one sidewall formed from refractory material, at least one first electrode, a plurality of electrically interconnected second electrodes, means for applying electrical power to such material through said first and second electrodes for heating such materials by the Joule effect, means mounting said first electrode in said chamber, and means mounting said second electrodes in said chamber with at least some of said second electrodes in a spaced relationship between said first electrode and said one sidewall such that said second electrodes limit the maximum potential difference in said one sidewall to a minor portion of the voltage between said first and second electrodes.

7. A furnace for electrically heating electrically conductive materials, as set forth in claim 6, and wherein said one sidewall is formed from refractory material which is electrically conductive at the temperature of such material when heated.

8. A furnace for electrically heating electrically conductive materials, as set forth in claim 7, and wherein said power applying means applies a predetermined voltage between said first and second electrodes, and wherein said second electrodes are located to limit the maximum potential difference in said one sidewall to not more than 3 percent of said predetermined voltage.

9. A furnace for electrically heating electrically conductive materials, as set forth in claim 6, and wherein said power applying means includes a multi-phase power source, said first electrode including at least one first electrode for each phase of said power source, means for connecting the different phases of said power source to different ones of said first electrodes, and wherein said second electrodes are mounted between said first electrodes and said one sidewall to limit the maximum potential difference in said one sidewall.

10. A furnace for electrically heating electrically conductive materials, as set forth in claim 9, and wherein said multi-phase power source applies predetermined voltages between said first electrodes, and wherein said second electrodes are located to limit the maximum potential difference in said one sidewall to not more than 3 percent of said predetermined voltages.

11. A furnace suitable for electrically heating molten glass having a predetermined high electrical resistivity when molten, comprising, in combination, a chamber for containing a molten body of such glass, said chamber having a bottom and at least one sidewall, said sidewall comprising refractory material which has an electrical resistivity at the temperature of such molten glass lower than the predetermined high electrical resistivity and said bottom comprising a refractory material having a high electrical resistivity at the temperature of such molten glass, at least one first electrode, a plurality of electrically interconnected second electrodes, means for applying electrical power to such molten glass through said first and second electrodes for heating such body of glass by the Joule effect, means mounting said first electrode in said chamber spaced from said sidewall, and means mounting said second electrodes in said chamber in a spaced relationship between said first electrode and said sidewall such that said second electrodes limit the maximum potential difference in said sidewall to a minor portion of the voltage between said first and second electrodes.

12. A furnace suitable for electrically heating molten glass, as set forth in claim 11, and wherein said at least one sidewall is of a chromic oxide refractory material.

13. A furnace suitable for electrically heating molten glass, as set forth in claim 12, and wherein said power applying means applies a predetermined voltage between said first and second electrodes, and wherein said second electrodes are located to limit the maximum potential difference in said sidewall to not more than 15 percent of said predetermined voltage.

14. A furnace suitable for electrically heating molten glass, as set forth in claim 13, and including means for maintaining a blanket of unmelted glass batch on the surface of such body of molten glass in said chamber.

15. A furnace suitable for electrically heating molten glass, as set forth in claim 14, and including a submerged throat in one of said at least one sidewall for removing molten glass from said chamber, and wherein at least one of said second electrodes is located adjacent said submerged throat whereby molten glass adjacent said throat is heated to cause upwardly directed convection currents in such molten glass adjacent said throat.

16. A furnace suitable for electrically heating molten glass, as set forth in claim 11, and wherein said power applying means applies a predetermined voltage between said first and second electrodes, and wherein said second electrodes are mounted to limit the maximum potential difference in said sidewall to not more than 3 percent of said predetermined voltage.

17. A furnace suitable for electrically heating molten glass, as set forth in claim 11, and including means for maintaining a blanket of unmelted glass batch on the surface of such body of molten glass in said chamber.

18. A furnace suitable for electrically heating molten glass, as set forth in claim 11, and including a submerged throat in one of said at least one sidewall for removing molten glass from said chamber, and wherein at least one of said second electrodes is located adjacent said submerged throat whereby molten glass adjacent said throat is heated to cause upwardly directed convection currents in such molten glass adjacent said throat.

19. A furnace suitable for electrically heating molten glass, as set forth in claim 11, and wherein said at least one sidewall comprises first and second pairs of parallel walls defining a rectangular chamber, wherein said at least one first electrode includes a plurality of electrodes mounted in a row in a first plane parallel to and spaced between said first pair of walls, wherein a first plurality of said second electrodes are mounted in a row in a second plane parallel to and spaced between one of said first walls and said first plane, wherein a second plurality of said second electrodes are mounted in a row in a third plane parallel to and spaced between the other of said first walls and said first plane, and wherein the end electrodes in said row of first electrodes are spaced appreciably further from said second walls than at least some of said second electrodes.

20. A furnace suitable for electrically heating molten glass, as set forth in claim 19, and wherein at least two second electrodes are mounted between said second and third planes in a fourth plane parallel to one of said second walls and at least two second electrodes are mounted between said second and third planes in a fifth plane parallel to the other of said second walls, said fourth and fifth planes being spaced between first electrodes and said second walls.

21. A furnace suitable for electrically heating molten glass, as set forth in claim 20, including a submerged throat in one of said first walls and spaced from said second walls, and wherein at least one of said second electrodes is located adjacent said submerged throat whereby molten glass adjacent said throat is heated to cause upwardly directed convection currents in such molten glass adjacent said throat.

22. A furnace suitable for electrically heating molten glass, as set forth in claim 11, wherein said at least one first electrode comprises three electrode groups, each group comprising at least one electrode, wherein said power applying means includes means for three-phase power between said three groups of first electrodes, and wherein at least some of said second electrodes are spaced between said first electrodes and said sidewall.

23. A furnace suitable for electrically heating molten glass, as set forth in claim 22, wherein each of said first electrode groups includes a plurality of first electrodes mounted in a row, and wherein said rows of first electrodes are parallel.

24. A furnace suitable for electrically heating molten glass, as set forth in claim 22, wherein at least some of said second electrodes are spaced substantially between said groups of first electrodes.

25. A furnace suitable for electrically heating molten glass, as set forth in claim 11, and wherein said power applying means includes a multi-phase power source, said at least one first electrode including at least one first electrode for each phase of said power source, means for connecting the different phases of said power source to different ones of said first electrodes, and wherein said second electrodes are spaced between said first electrodes and said sidewalls to reduce electrical stresses in said sidewalls.

26. A furnace suitable for electrically heating molten glass, as set forth in claim 25, and wherein at least some of said second electrodes are spaced substantially between the ones of said first electrodes connected to different phases of said power source.

27. A method of heating molten glass in an electric furnace having at least one sidewall constructed of a refractory material which is electrically conductive at the temperature of the molten glass, said method including the steps of:
1. placing in said furnace at least one first electrode, at least one second electrode and a plurality of interconnected electrodes with said interconnected electrodes positioned between said first electrode and said sidewall;
2. placing in said furnace a charge of molten glass having a higher electrical resistivity than the refractory material in said furnace sidewall at the temperature of the molten glass; and
3. supplying electrical power to the molten glass through said first and second electrodes to heat the glass by the Joule effect, whereby said plurality of interconnected electrodes limit the maximum potential difference in said sidewall to a minor portion of the voltage between said first and second electrodes.

28. A method of heating glass in an electric furnace, as claimed in claim 27, wherein a charge of glass having less than 1 percent alkali metal content is placed in said furnace.

29. A method of heating glass in an electric furnace, as claimed in claim 28, and including the step of maintaining a continuous blanket of unmelted glass materials floating on the surface of the molten glass in said furnace.

30. A method of heating glass in an electric furnace, as claimed in claim 40, wherein said plurality of interconnected electrodes positioned between said at least one first electrode and said sidewall are interconnected with said second electrode.

31. A method of heating glass in an electric furnace, as claimed in claim 27, wherein a plurality of said interconnected electrodes are also positioned between said at least one second electrode and said sidewall.

32. A method of heating glass in an electric furnace, as claimed in claim 31, and placing at least one third electrode within said furnace, wherein power is also supplied to said at least one third electrode, and wherein a plurality of said interconnected electrodes are also positioned between said at least one third electrode and said sidewall.

33. A method of heating glass in an electric furnace, as claimed in claim 32, wherein at least some of said interconnected electrodes are positioned substantially between said first, second and third electrodes.

34. A method of heating glass in an electric furnace, as claimed in claim 27, wherein said interconnected electrodes are positioned between said first electrodes and said sidewall to limit the maximum potential difference in said sidewall to not more than 3 percent of the voltage between said first and second electrodes.

35. A method of heating an electrically conductive material in an electric furnace having a chamber with at least one sidewall for containing a body of such material, said method including the steps of:
1. placing in said furnace at least one first electrode, at least one second electrode and a plurality of interconnected electrodes with said interconnected electrodes positioned between said first electrode and said sidewall;
2. placing a charge of the material in the furnace chamber; and
3. supplying electrical power to the material through said first and second electrodes to heat the material by the Joule effect, whereby said interconnected electrodes limit the maximum potential difference in said sidewall to a minor portion of the voltage between said first and second electrodes.

36. A method of heating an electrically conductive material in an electric furnace, as claimed in claim 41, wherein said interconnected electrodes are positioned between said first electrodes and said sidewall to limit the maximum potential difference in said sidewall to not more than 3 percent of the voltage between said first and second electrodes.

37. A method of heating an electrically conductive material in an electric furnace, as claimed in claim 35, wherein said plurality of interconnected electrodes positioned between said at least one first electrode and said sidewall are interconnected with said second electrode.

38. A method of heating an electrically conductive material in an electric furnace, as claimed in claim 35, wherein a plurality of said interconnected electrodes are also positioned between said at least one second electrode and said sidewall.

39. A method of heating an electrically conductive material in an electric furnace, as claimed in claim 38, and placing at least one third electrode within said furnace, wherein power is also supplied to said at least one third electrode, and wherein a plurality of said interconnected electrodes are also positioned between said at least one third electrode and said sidewall.

* * * * *